(12) United States Patent
Hage-Hassan et al.

(10) Patent No.: US 11,117,500 B2
(45) Date of Patent: Sep. 14, 2021

(54) VEHICLE SEAT

(71) Applicants: TS TECH CO., LTD., Saitama (JP); HONDA MOTOR CO., LTD., Tokyo (JP)

(72) Inventors: Souheil Hage-Hassan, Reynoldsburg, OH (US); Dinesh Hadadare, Reynoldsburg, OH (US); Teppei Ito, Reynoldsburg, OH (US); Derek Shane Lindsay, Marysville, OH (US); Kenneth Kirby Pilcher, Marysville, OH (US)

(73) Assignees: TS TECH CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/671,655

(22) Filed: Nov. 1, 2019

(65) Prior Publication Data
US 2021/0129717 A1 May 6, 2021

(51) Int. Cl.
*B62D 43/00* (2006.01)
*B60R 7/00* (2006.01)
*B60N 2/30* (2006.01)
*B60N 2/68* (2006.01)
*B60N 2/36* (2006.01)
*B60N 2/005* (2006.01)

(52) U.S. Cl.
CPC ........... *B60N 2/3075* (2013.01); *B60N 2/686* (2013.01); *B60N 2002/0055* (2013.01); *B60N 2002/363* (2013.01)

(58) Field of Classification Search
CPC .... B60N 2/3011; B60N 2/305; B60N 2/2362; B60N 2/3079; B60N 2/021583; B60N 2002/948; B60N 2205/35; B60N 2/3075; B60N 2/36; B60N 2/3031
See application file for complete search history.

(56) References Cited

U.S. PATENT DOCUMENTS

| 3,450,429 A | * | 6/1969 | Stata | B60N 3/044 296/97.23 |
| 5,056,846 A | * | 10/1991 | Tanaka | B60R 5/04 296/37.1 |
| 6,050,202 A | * | 4/2000 | Thompson | B60N 3/001 108/144.11 |

(Continued)

FOREIGN PATENT DOCUMENTS

JP 2009-090805 A 4/2009

*Primary Examiner* — Shin H Kim
(74) *Attorney, Agent, or Firm* — Michael Best & Friedrich LLP

(57) ABSTRACT

Provided is a vehicle seat in which entry of foreign matter from an opening part formed in a cover member is suppressed when stored. The vehicle seat of the present invention includes a seat cushion 11 on which an occupant sits, a leg member 20 that supports the seat cushion 11 and includes a locking device 22 at a lower end, a cover member 30 that covers a front side of the leg member 20, wherein an opening part is formed at a position of the cover member that overlaps with the locking device 22, and an elastically deformable lip part 40 that is attached to the cover member 30 and that covers the opening part. Since the opening part is covered by the lip part, the entry of foreign matter is suppressed.

20 Claims, 8 Drawing Sheets

(56) References Cited

U.S. PATENT DOCUMENTS

| | | | | |
|---|---|---|---|---|
| 6,261,667 B1 * | 7/2001 | Yang | B60N 3/044 | |
| | | | 15/215 | |
| 6,518,883 B1 * | 2/2003 | Benard | E05B 79/06 | |
| | | | 307/10.2 | |
| 6,695,380 B1 * | 2/2004 | Hicks | B60R 5/04 | |
| | | | 296/37.14 | |
| 6,955,387 B2 * | 10/2005 | Mills | B60R 5/04 | |
| | | | 296/39.1 | |
| 7,252,320 B2 * | 8/2007 | Tsujibayashi | B60N 2/01583 | |
| | | | 296/65.05 | |
| 7,401,716 B2 * | 7/2008 | Svenson | B60R 5/045 | |
| | | | 224/42.32 | |
| 7,597,372 B2 * | 10/2009 | Nagamoto | B62D 43/06 | |
| | | | 296/37.1 | |
| 7,748,775 B2 * | 7/2010 | Mercurio | B60R 5/04 | |
| | | | 296/193.07 | |
| 7,810,875 B2 * | 10/2010 | Gerisch | B21D 53/88 | |
| | | | 296/193.07 | |
| 8,052,194 B2 * | 11/2011 | Sayama | B60N 2/3079 | |
| | | | 296/65.09 | |
| 8,141,930 B2 * | 3/2012 | Sayama | B60N 2/305 | |
| | | | 296/65.09 | |
| 8,177,281 B2 * | 5/2012 | Sayama | B60N 2/3075 | |
| | | | 296/65.05 | |
| 8,336,955 B2 * | 12/2012 | Sayama | B60N 2/3075 | |
| | | | 297/15 | |
| 8,540,308 B2 * | 9/2013 | Aoki | B60N 2/3079 | |
| | | | 297/15 | |
| 8,579,346 B2 * | 11/2013 | Schaefer | E05B 79/06 | |
| | | | 296/1.08 | |
| 8,678,462 B2 * | 3/2014 | Simon | B60R 5/04 | |
| | | | 296/37.14 | |
| 8,720,969 B2 * | 5/2014 | Young | B60R 5/04 | |
| | | | 296/97.23 | |
| 9,062,474 B2 * | 6/2015 | Ibrahim | B25G 1/04 | |
| 9,797,160 B2 * | 10/2017 | Lin | E05B 1/0015 | |
| 10,017,212 B2 * | 7/2018 | Cassiani | B60R 11/00 | |
| 10,414,299 B2 * | 9/2019 | Ikawa | B60N 2/3011 | |
| 10,494,842 B2 * | 12/2019 | Lepper | E05B 65/006 | |
| 10,632,873 B2 * | 4/2020 | Bagian | B60N 2/3031 | |
| 2009/0166366 A1 * | 7/2009 | Kaneko | B65D 25/30 | |
| | | | 220/676 | |
| 2010/0207420 A1 | 8/2010 | Sayama | | |
| 2010/0320824 A1 * | 12/2010 | Aoki | B60N 2/36 | |
| | | | 297/378.1 | |

* cited by examiner

VEHICLE SEAT

BACKGROUND OF THE INVENTION

Field of the Invention

The present invention relates to a vehicle seat, and more particularly, to a vehicle seat equipped with a leg member for supporting a seating part.

Description of the Related Art

A vehicle seat that supports a rear end of a seat cushion (a seating part) to be rotatable in a front to back direction on a front side of a storage recess formed in a vehicle body floor, and is capable of rotating the seatback backward and storing in the storage recess in a state of reclining the seatback on the seat cushion has been known. JP 2009-90805 A discloses a vehicle storage seat that pivotally supports a rotation axis provided on right and left sides of a rear end of the seat cushion by brackets provided on both front right and left ends of the storage recess, and is capable of storing a seat in the storage recess by attaching a rear end of the seat cushion to be rotatable in the front to back direction.

In the vehicle storage seat disclosed in JP 2009-90805 A, when a locking claw provided on a front leg having a cover is locked to a leg striker provided on a vehicle body floor side, the vehicle storage seat is fixed in a state in which it can be used by an occupant. In order to lock the locking claw to the leg striker, a hole (an opening part) through which the leg striker passes is also formed in the cover attached to the front leg. Further, when the vehicle storage seat is stored in the storage recess, the front leg is stored on a lower surface of the seat cushion, and the lower surface of the seat cushion faces upward. Therefore, since the cover attached to the front leg was exposed to the vehicle body floor, there was a possibility that foreign matter may enter through the hole formed in the cover.

SUMMARY OF THE INVENTION

Therefore, the present invention has been made in view of the above-described problems, and an object thereof is to provide a vehicle seat in which the entry of foreign matter from the opening part formed in the cover of the leg is suppressed even when stored.

According to the vehicle seat of the present invention, the object is solved by including a seating part on which an occupant sits; a leg member that supports the seating part and that includes a locking device at a lower end of the leg member; a cover member that covers a front side of the leg member, wherein an opening part is formed at a position of the cover member that overlaps with the locking device; and an elastically deformable lip part that is attached to the cover member and that covers the opening part.

In the vehicle seat of the present invention configured as described above, since the elastically deformable lip part covers the opening part formed in the cover member, even when the vehicle seat is stored, the entry of foreign matter from the opening part formed in the cover of the leg is suppressed.

Further, in the above-described vehicle seat, it is preferable that the opening part of the cover member be disposed at a position out of a center in a width direction of the cover member.

According to the above configuration, for example, by disposing the opening part through which the striker passes at the position out of the center in the width direction of the cover member, the rigidity of the cover member can be improved.

Further, in the above-described vehicle seat, it is preferable that the cover member includes a bead portion around the opening part.

By providing the bead portion around the opening part, the rigidity of the cover member can be improved.

Further, in the above-described vehicle seat, it is preferable that the lip part be located at a rear of a front surface of the cover member.

Since the lip part is located at the rear of the front surface of the cover member, for example, when stored, the lip part is disposed below the vehicle body floor. As a result, since the luggage or the like placed on the vehicle body floor is prevented from coming into direct contact with the lip part, deterioration of the lip part is suppressed.

Further, in the above-described vehicle seat, it is preferable that a contact surface at which the cover member and the lip part contact with each other be inclined.

Since the contact surface at which the cover member and the lip part contact with each other is inclined, the lip part retreats from the front surface of the cover member, and is disposed below the vehicle body floor, for example, when stored. As a result, since the luggage or the like placed on the vehicle body floor is prevented from coming into direct contact with the lip part, deterioration of the lip part is suppressed.

In the above-described vehicle seat, the lip part may include a first slit that extends upward from a lower end of the lip part and a second slit that extends in a width direction of the cover member and that intersects with the first slit in a T-shape, and wherein a notch may be formed at an intersection of the first slit and the second slit.

By forming the first slit and the second slit in the lip part and forming the notch at the intersection thereof, for example, it is easy to insert the striker into the lip part.

Further, in the above-described vehicle seat, it is preferable that a first slit extending upward from a lower end of the lip part be provided in the lip part, and a notch be formed at a lower end of the first slit.

By forming the notch at the lower end of the first slit, for example, it is easy to insert the striker into the lip part.

Further, in the above-described vehicle seat, it is preferable that a plurality of protruding parts be provided on a face of the lip part opposing to the locking device.

By forming the plurality of protruding parts on the face of the lip part opposing to the locking device, it is possible to suppress, for example, noise generated when the lip part comes into contact with the locking device.

Further, in the above-described vehicle seat, it is preferable that a grip portion be provided on a lower surface of the seating part, wherein the grip portion is located at front of and above the cover member when the vehicle seat is in a seatable state.

When the grip portion is provided on the lower surface of the seating part, and the vehicle seat is in a seatable state, since the grip portion is at front of and above the cover member, the occupant easily lifts the seating part. Further, the leg member does not interfere with the grip portion, and the occupant easily inserts a hand into the grip portion.

Further, in the above-described vehicle seat, it is preferable that the seating part includes a housing part configured to house the leg member and the cover member and provided on a lower surface of the seating part.

By providing the housing part configured to house the leg member and the cover member on the lower surface of the seating part, the vehicle floor and the lower surface of the seating part can be made flat when stored, and the luggage can be easily placed.

Further, according to the vehicle seat of the present invention, the object is solved by a vehicle seat rotatable backward for storage including: a seating part on which an occupant sits; a support member that supports rotatably one side of the seating part; a leg member that supports the seating part and that includes a locking device at a lower end of the leg member; a cover member that covers a front side of the leg member, wherein an opening part is formed at a position of the cover member that overlaps with the locking device; and an elastically deformable lip part that is attached to the cover member and that covers the opening part.

In the vehicle seat of the present invention, since the elastically deformable lip part covers the opening part formed in the cover member, even when the vehicle seat is stored, entry of a foreign material from the opening part formed in the cover of the leg is suppressed.

Further, for example, since the opening part through which the striker passes is disposed at a position out of a center in a width direction of the cover member, the rigidity of the cover member can be improved.

Moreover, the rigidity of the cover member can be improved by providing a bead portion around the opening part.

In addition, since the lip part is located at a rear of a front surface of the cover member, for example, when stored, the lip part is disposed below the vehicle body floor. As a result, since the luggage or the like placed on the vehicle body floor is prevented from coming into direct contact with the lip part, deterioration of the lip part is suppressed.

In addition, since a contact surface at which the cover member and the lip part contact with each other is inclined, the lip part retreats from the front surface of the cover member, and is disposed below the vehicle body floor, for example, when stored. As a result, since the luggage or the like placed on the vehicle body floor is prevented from coming into direct contact with the lip part, deterioration of the lip part is suppressed.

By forming the first slit and the second slit in the lip part and forming the notch at the intersection thereof, for example, it is easy to insert the striker into the lip part.

By forming the notch at the lower end of the first slit, for example, it is easy to insert the striker into the lip part.

By forming a plurality of protruding parts on the face of the lip part opposing to the locking device, it is possible to suppress, for example, noise generated when the lip part comes into contact with the locking device.

When the grip portion is provided on the lower surface of the seating part, and the vehicle seat is in a seatable state, since the grip portion is at front of and above the cover member, the occupant easily lifts the seating part. Further, the leg member does not interfere with the grip portion, and the occupant easily inserts a hand into the grip portion.

By providing the housing part configured to house the leg member and the cover member on the lower surface of the seating part, the vehicle floor and the lower surface of the seating part can be made flat when stored, and the luggage can be easily placed.

DETAILED DESCRIPTION

Figure 1:
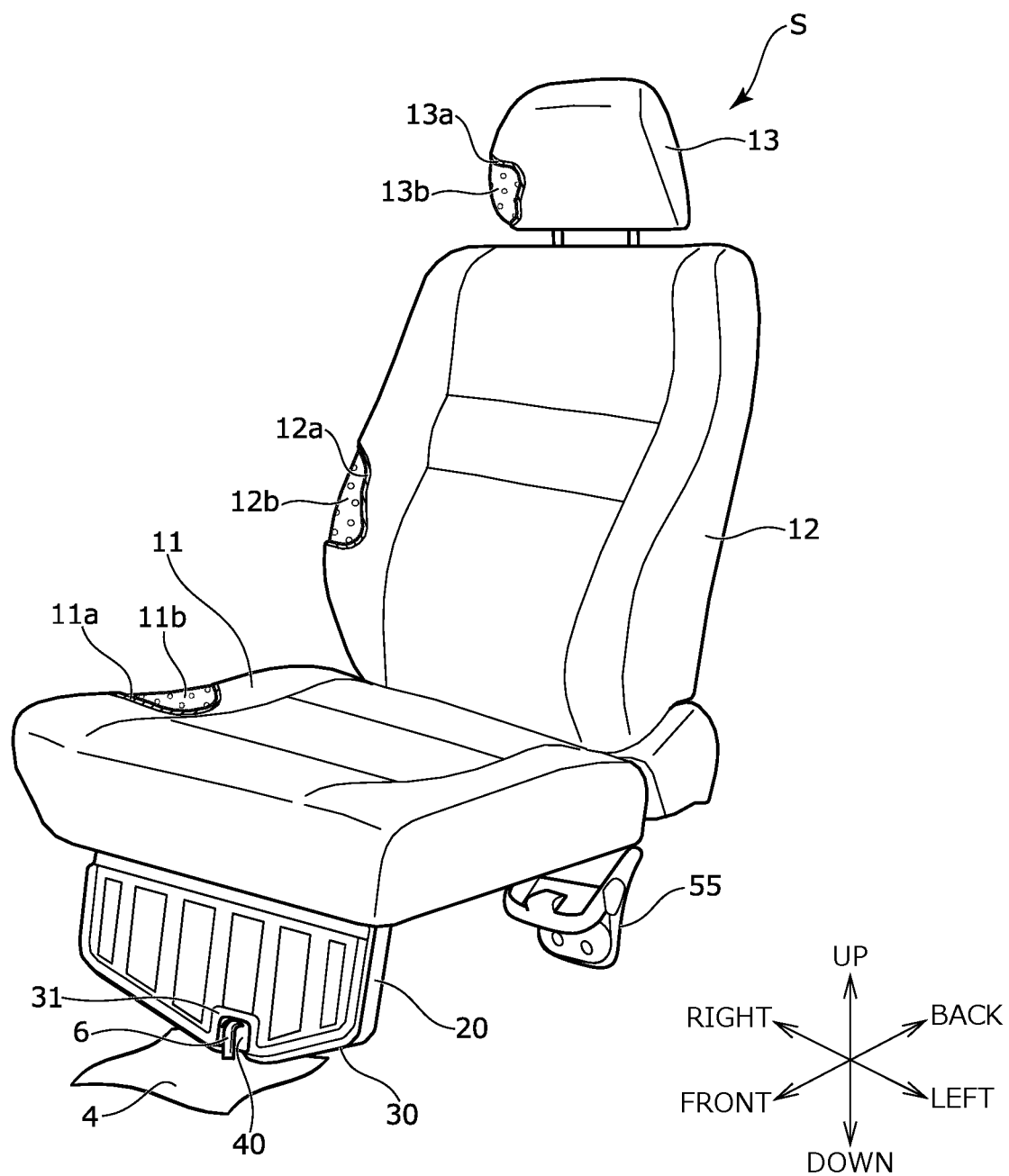
FIG. 1 is a front perspective view of a vehicle storage seat according to an embodiment of the present invention.

Hereinafter, a configuration of a vehicle storage seat S (vehicle seat) according to an embodiment of the present invention will be described with reference to FIGS. 1 to 10.

Further, the embodiments described below are merely examples for facilitating the understanding of the present invention, and are not intended to limit the present invention. That is, it is a matter of course that the shapes, sizes, arrangements, and the like of members described below can be modified or improved without departing from the scope of the present invention, and the present invention includes the equivalents thereof. Further, in the following embodiments, the same or similar constituent elements are denoted by the same reference numerals, and the drawings are appropriately scaled in order to facilitate the understanding.

A vehicle equipped with the vehicle storage seat S according to the present embodiment includes, for example, three-row seats arranged in series in the front to back direction, and the seat of the third row is configured to be storable. The vehicle storage seat S according to the present embodiment relates to the seat of the third row, and a storage recess 5 as storage means for storing the vehicle storage seat S is provided on a vehicle body floor 4 (see FIGS. 5A to 5C) at a rear of the vehicle storage seat S. Further, in the vehicle, a floor carpet (not illustrated) is laid over substantially the entire surface of the vehicle body floor 4.

The seat of the third row has three seats on the right and left sides, but the vehicle storage seat S illustrated in FIG. 1 illustrates a right seat for one person among them. The storage mechanism and the operation method are the same as each other for the left seats for two persons, and in the following description, the vehicle storage seat S which is the right seat will be described.

Further, in the following description, as indicated by the arrows illustrated in FIG. 1, the front to back direction means a front to back direction as viewed from an occupant who sits on the vehicle storage seat S, a width direction means a width direction (a lateral width direction) of the seat cushion 11 of the vehicle storage seat S, and a height direction means a height direction of the seat cushion 11, strictly speaking, a vertical direction of the seatback 12 when the vehicle storage seat S is viewed from the front. Further, the shapes and the arrangement positions of each member described below are the shapes and the arrangement positions when the vehicle storage seat S is in the seatable state, unless otherwise specified.

Figure 2:
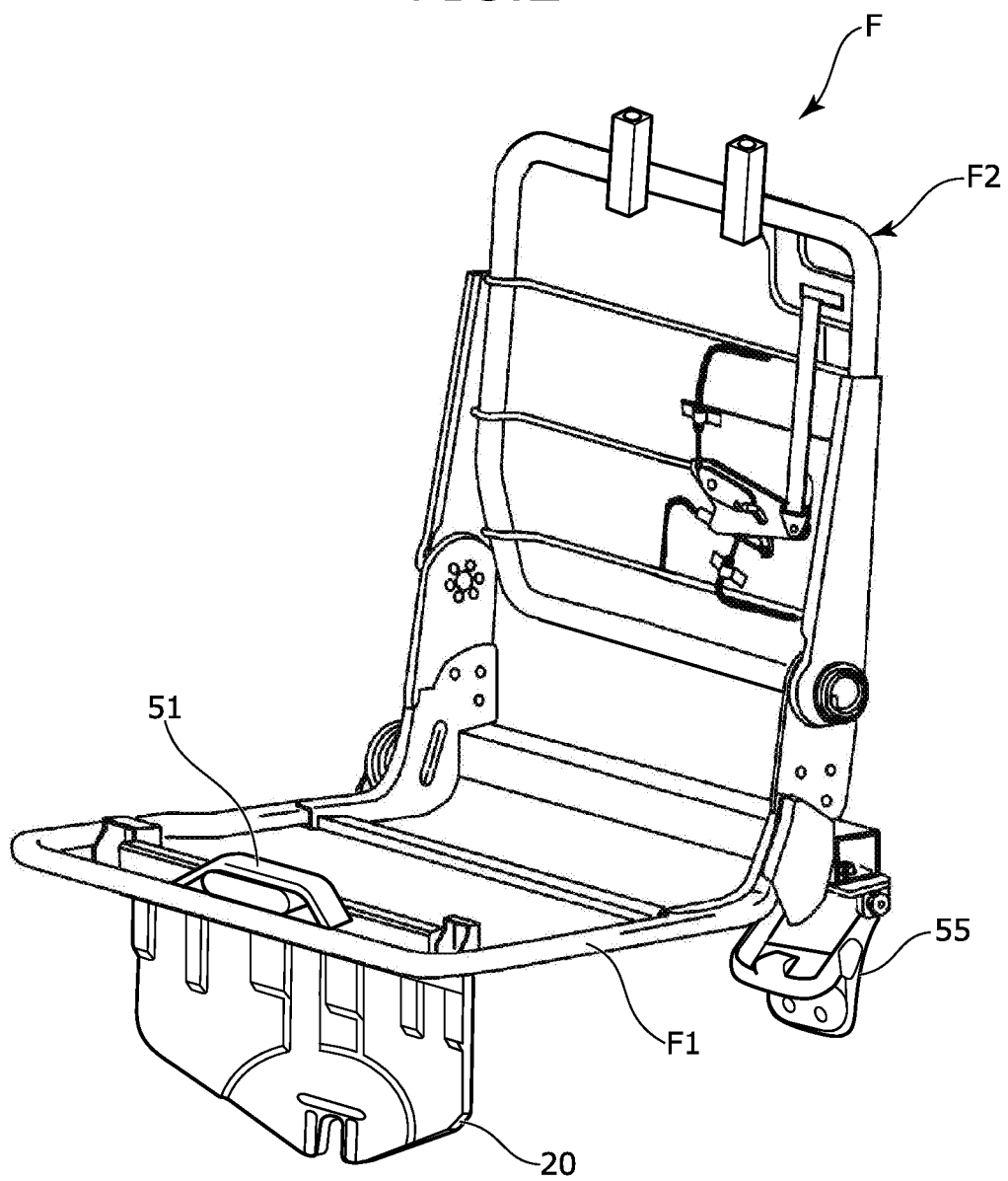
FIG. 2 is a schematic perspective view of a seat frame.

FIGS. 1 and 2 illustrate a structure of the vehicle storage seat S. As illustrated in FIG. 1, the vehicle storage seat S includes a seat cushion 11 (a seating part) on which the occupant sits and the buttocks of the occupant are supported, a seatback 12 that supports the back of the occupant, and a headrest 13 that supports the head of the occupant. Further, the vehicle storage seat S includes a leg member 20 that supports the seat cushion 11 and includes a locking device 22 at a lower end, and a cover member 30 that covers the front side of the leg member 20. Further, the vehicle storage seat S includes a support member 55 that rotatably supports the rear end of the seat cushion 11. The seat frame F includes a seat cushion frame F1 and a seatback frame F2.

The seat cushion 11 is configured by placing a cushion material 11b on the seat cushion frame F1 illustrated in FIG. 2 and by covering the cushion material 11b with a skin material 11a.

The front side of the seat cushion frame F1 of the seat cushion 11 is supported on the vehicle body floor 4 by the leg member 20. Further, the rear end side of the seat cushion frame F1 is supported to be rotatable in the front to back direction by a support member 55 fixed to the vehicle body floor 4 side.

The seatback 12 is configured by placing a cushion material 12b on a seatback frame F2 illustrated in FIG. 2 and by covering the cushion material 12b with a skin material 12a.

The seatback frame F2 includes two vertically extending side frames disposed to be separated in the right to left direction, and a central frame which is a substantially rectangular frame sandwiched between the side frames.

The headrest 13 is configured by disposing a cushion material 13b on a core material (not illustrated) and by covering the cushion material 13b with a skin material 13a. Further, the skin materials 11a to 13a provided on the vehicle storage seat S are made of, for example, a material such as cloth or leather. Further, the cushion materials 11b to 13b are urethane substrates molded by foam molding using, for example, a urethane foam material.

The leg member 20 illustrated in FIG. 2 supports the front side of the seat cushion frame F1 and is connected to the vehicle body floor 4 side. The leg member 20 is supported on the front side of the seat cushion frame F1 at the upper portion so as to be rotatable in the front to back direction, and when in the seatable state, a locking device 22 detachably connected to the striker 6 provided on the vehicle body floor 4 side is provided at the lower portion of the leg member 20 (see FIG. 4). The locking device 22 is provided with a locking claw 23, and the leg member 20 is fixed to the vehicle body floor 4 by locking the locking claw 23 to the striker 6. When the locking claw 23 rotates about a locking claw rotation axis 24, locking with the striker 6 on the vehicle body floor 4 side is released. When the locked state provided by the locking claw 23 is released, the seat cushion 11 enters a rotatable state in the front to back direction. Further, rotation of the locking claw 23 is biased by a biasing spring (not illustrated) in such a direction that the locked state with the striker 6 is maintained at all times. Although the number of the locking claw 23 provided in the locking device 22 of the present embodiment is one, two or more locking claws 23 may be provided in the locking device 22.

Figure 5A:
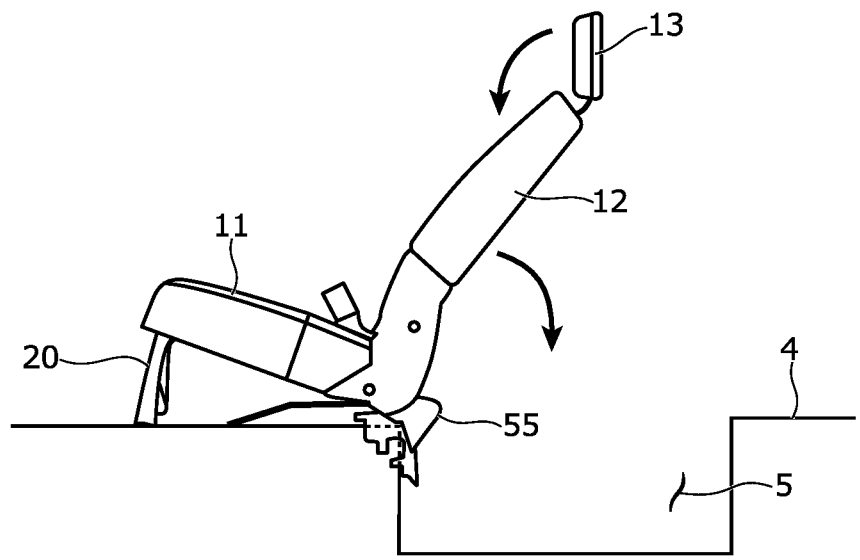
FIG. 5A is an explanatory view describing an operation procedure at the time of the storage operation of the vehicle storage seat, and is a view illustrating the vehicle storage seat in a seatable state.
Figure 5B:
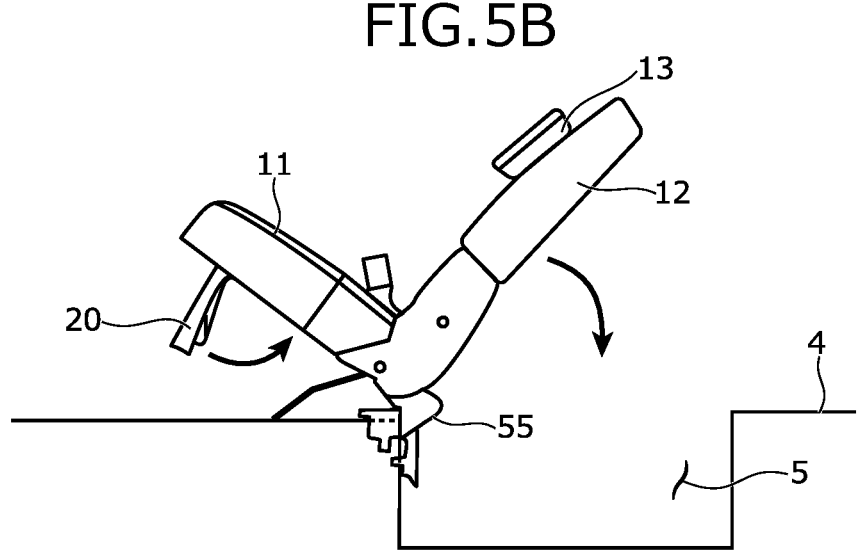
FIG. 5B is a view illustrating a state in which a headrest is folded and the vehicle storage seat is reclined backward.
Figure 5C:
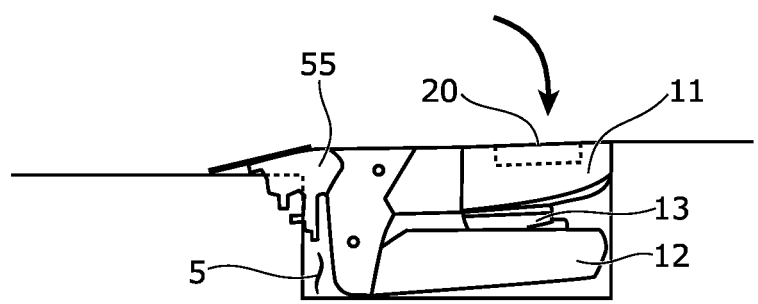
FIG. 5C is a view illustrating a state in which the vehicle storage seat is stored in the storage part.

Here, an operation when storing the vehicle storage seat S according to the present embodiment will be described using FIGS. 5A to 5C. The vehicle storage seat S illustrated to FIG. 5A illustrates a seatable state, and a state of being fixed to the vehicle body floor 4 by the locking device. Next, FIG. 5B illustrates a state in which the locking claw 23 of the locking device 22 is released, the headrest 13 is reclined to the seatback 12, and the vehicle storage seat S is advanced to rotate backward. When the rotation is further advanced, the center of gravity of the vehicle storage seat S exceeds a midpoint of the rotation, and thereafter, the vehicle storage seat S is rotated backward by its own weight to reach the stored state as illustrated in FIG. 5C. In the stored state, the leg member 20 and the cover member 30 are folded to the seat cushion 11 side.

Figure 6:
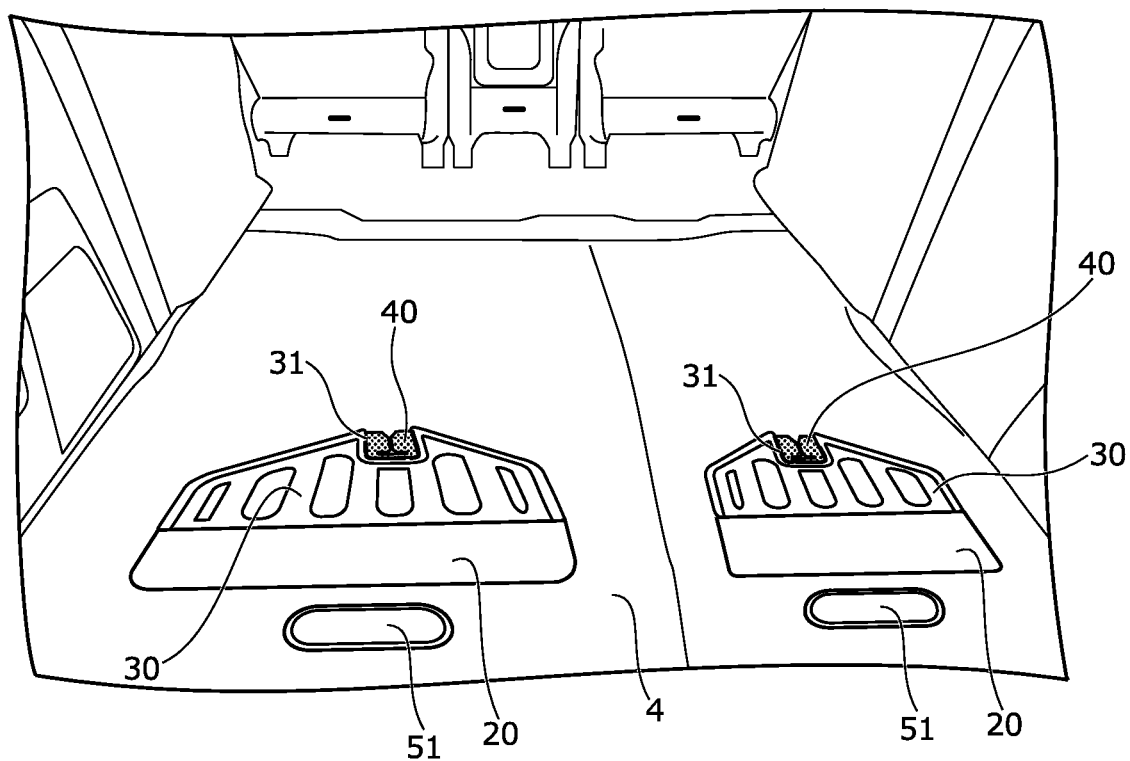
FIG. 6 is a view illustrating a state of a vehicle body floor in which the vehicle storage seat is stored.

FIG. 6 illustrates a state in which the vehicle storage seat S is stored, the opening part of the storage recess 5 becomes a flat surface integral with the back surface of the seat cushion 11 so that a wide loading space can be secured. At this time, the leg member 20 and the cover member 30 for covering the front surface thereof are exposed to the vehicle body floor 4 on the back surface of the seat cushion. An opening part 31 is formed in the cover member 30 at a position that overlaps with the locking device 22 in order to lock the locking device 22 of the leg member 20 to the striker 6. However, since the opening part 31 is exposed to the vehicle body floor 4 in the stored state, there is a risk of entry of foreign matter from the opening part 31. The cover member 30 of the vehicle storage seat S is provided with an elastically deformable lip part 40 that covers the opening part 31. By providing the lip part 40, the opening part 31 is closed in the stored state, and the entry of foreign matter from the opening part 31 is suppressed. Further, even in the seatable state, since the lip part 40 is elastically deformed, the striker 6 can be inserted into the opening part 31 and the locking claw 23 of the locking device 22 can be locked to the striker 6.

Figure 7:
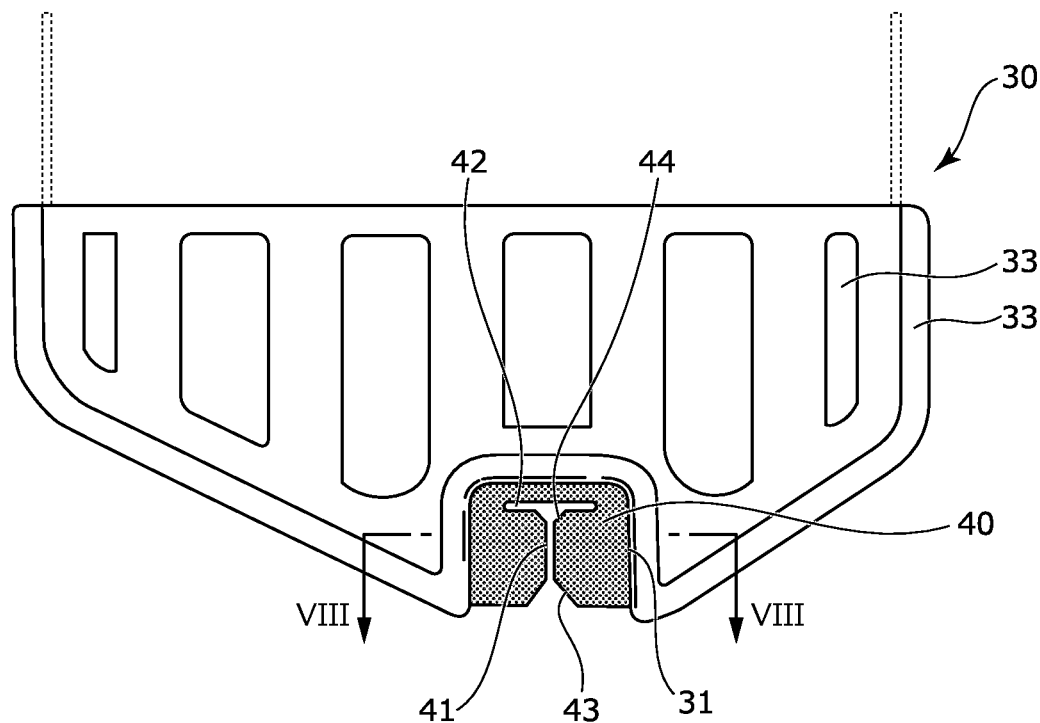
FIG. 7 is a view illustrating a front surface of the cover member.

The cover member 30 and the lip part 40 will be described in more detail using FIGS. 7 to 9. As illustrated in FIG. 7, in the cover member 30, the opening part 31 into which the striker 6 is inserted is formed, and the elastically deformable lip part 40 that covers the opening part 31 is provided. The opening part 31 is formed at a position of the cover member that overlaps with the locking device 22. The opening part 31 is disposed at a position out of the center of the cover member 30 in the width direction. When the opening part 31 is provided, since the height of the cover member 30 is reduced, the rigidity is lowered. Therefore, the rigidity of the cover member as a whole can be improved, by avoiding the formation of the opening part 31 at the center in the width direction on which the load is concentrated, and by suppressing the decrease in the rigidity at the central portion of the cover member 30. Further, in the present embodiment, the width direction of the cover member 30 is the same as the width direction of the vehicle storage seat S.

In addition, the cover member 30 is provided with a bead portion 33 around the opening part 31. When the striker 6 is inserted and the lip part 40 is elastically deformed, a deformation pressure is applied to the opening part 31. However, since the rigidity is improved by providing the bead portion 33 around the opening part 31, deformation of the opening part 31 can be suppressed. Further, the cover member 30 is formed with a plurality of bead portions 33 extending in the vertical direction in the seatable state. By providing the plurality of bead portions 33, the rigidity of the cover member 30 is improved.

Figure 8:
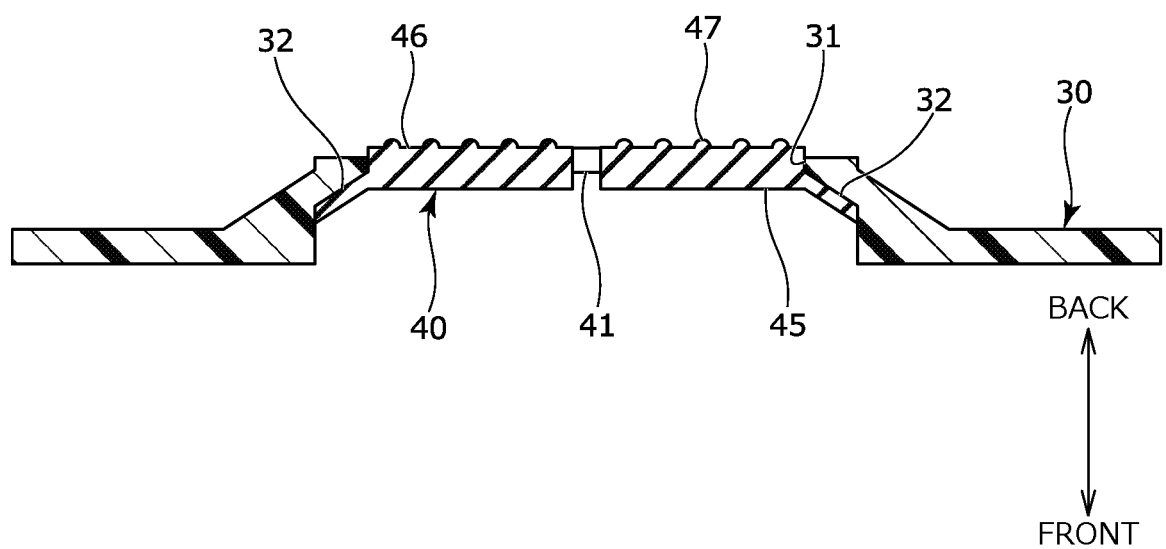
FIG. 8 is a cross-sectional view taken along line VIII-VIII of FIG. 7.
Figure 9:
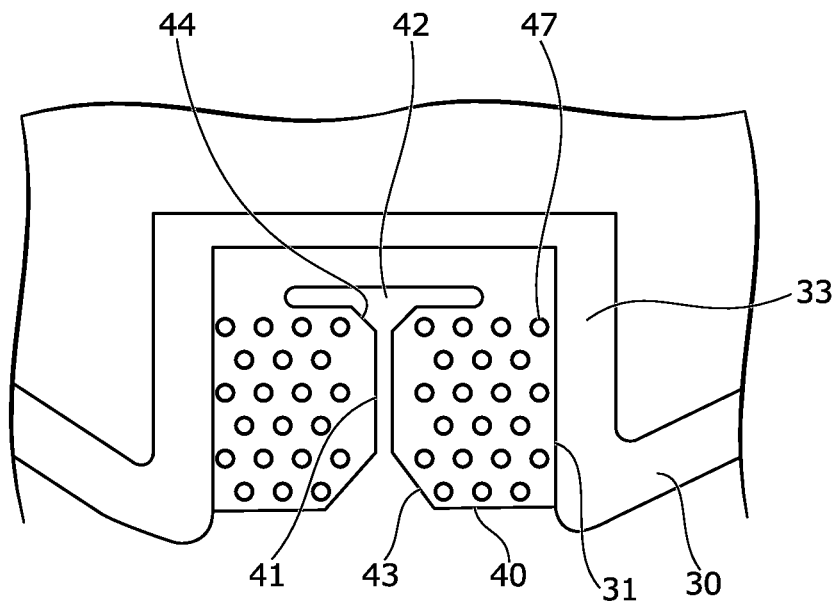
FIG. 9 is a rear view illustrating a rear surface of the lip part.

The lip part 40 is located at the rear of the front surface of the cover member 30 as illustrated in FIG. 8. Further, a contact surface 32 at which the lip part 40 and the cover member 30 contact with each other is inclined as illustrated in FIG. 8. Since the contact surface 32 is inclined, a contact area becomes larger than in the case of planar contact, and the contact can be performed firmly. In addition, the lip part 40 is located at the rear of the front surface of the cover member 30. In other words, the front surface 45 of the lip part 40 is retreated to form a recess. Therefore, for example, when the vehicle storage seat S is in the stored state, since the lip part 40 is exposed on the vehicle body floor 4 but is a recess, the luggage carried on the vehicle body floor 4 is prevented from coming into direct contact with the lip part 40. Thus, deterioration of the lip part 40 is suppressed.

As illustrated in FIG. 7, when the vehicle storage seat S is in the seatable state, a first slit 41 extending upward from the lower end, and a second slit 42 intersecting with the first slit 41 in a T-shape and extending in the width direction of the cover member 30 are formed in the lip part 40. Further, a notch 44 is formed at an intersection of the first slit 41 and the second slit 42. A notch 43 is formed at the lower end of the first slit 41. The width of the notch 43 is larger than the width of the striker 6 so that the striker 6 can be easily inserted into the first slit 41. In addition, the width of the first slit 41 is preferably smaller and is at least smaller than the width of the striker 6. Therefore, the entry of foreign matter from the first slit 41 is suppressed in the stored state. In addition, although the T-shaped slit is formed in the lip part 40 of this embodiment, the second slit 42 may be omitted and the first slit 41 may be formed in an I-shape. A circular hole may be formed instead of the second slit 42.

A plurality of protruding parts 47 is formed on the back surface 46 of the lip part 40, that is, the surface of the leg member 20 facing the locking device 22. Although noise may occur when the elastically deformable lip part 40 and the locking device 22 come into contact with each other, since the area of direct contact decreases by providing the plurality of protruding parts 47, it is possible to suppress an occurrence of the noise.

Figure 3:
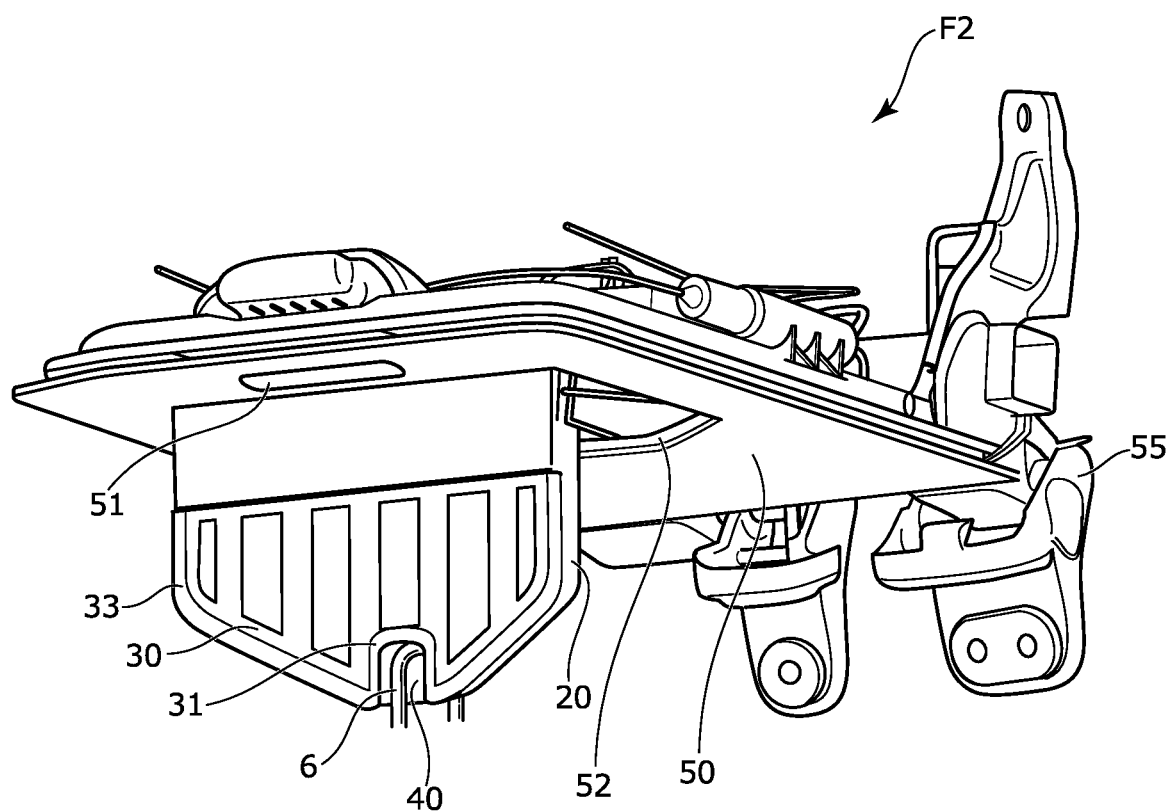
FIG. 3 is a perspective view of the cushion frame as viewed obliquely from below.
Figure 4:
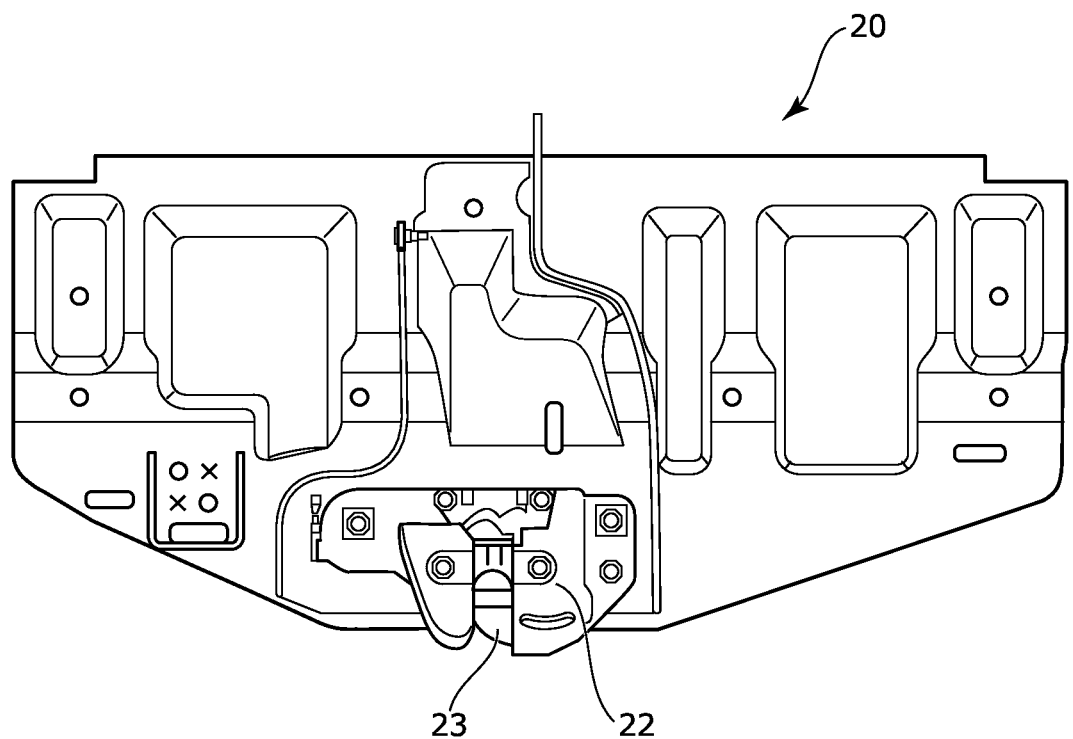
FIG. 4 is a rear view illustrating a rear of the leg member.
Figure 10:
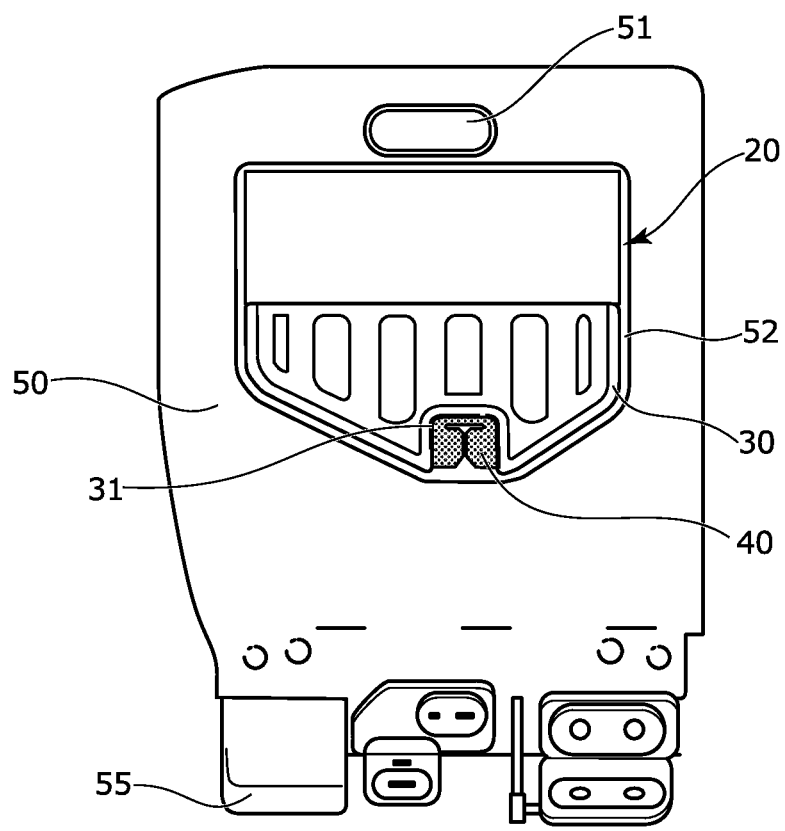
FIG. 10 is a bottom view illustrating a lower surface of the seat cushion.

As illustrated in FIGS. 3 and 10, in the vehicle storage seat S of the present embodiment, a seat plate 50 is provided on the lower surface of the seat cushion 11 so that the lower surface becomes planar when stored. Further, as illustrated in FIG. 10, the seat plate 50 is provided with a housing part 52 that houses the leg member 20 and the cover member 30.

Further, on the lower surface of the seat cushion 11, a grip portion 51 formed in a concave shape is provided so that a finger can be easily applied. The grip portion 51 is provided so as to be located at the front of and above the cover member 30 when the vehicle storage seat S is in the seatable state. Therefore, when in the seatable state, the occupant can easily lift the seat cushion 11 by inserting a finger into the grip portion 51 and gripping the front end of the seat cushion 11. Further, by providing the grip portion 51 at the front of the cover member 30, the leg member 20 does not interfere with the grip portion 51, and the occupant can easily insert a hand into the grip portion 51.

Although the lip part 40 of the present embodiment is made of acrylic rubber, the material of the lip part 40 is not limited thereto, and the lip part 40 may be made of fluoro-rubber, silicone rubber, hydrogenated nitrile rubber or the like.

The embodiment of the present invention has been described above, while referring to the drawings. In the above embodiment, the vehicle storage seat mounted on a vehicle has been described as a specific example, but the vehicle storage seat is not limited to a vehicle, the vehicle storage seat can also be provided as a seat for trains, buses, and the like, and can also be used as a seat for airplanes and ships.

In addition, although the vehicle storage seat that can be rotated backward and stored has been described, a cover member to which a lip part is attached may be applied to the leg member of the vehicle storage seat that can be rotated forward and stored. Further, the vehicle storage seat may be rotated not only in the front to back direction but also in the lateral direction.

REFERENCE SIGNS LIST

S VEHICLE STORAGE SEAT (VEHICLE SEAT)
F SEAT FRAME
F1 SEAT CUSHION FRAME
F2 SEATBACK FRAME
4 VEHICLE BODY FLOOR
5 STORAGE RECESS
6 STRIKER
11 SEAT CUSHION (SEATING PART)
11a SKIN MATERIAL
11b CUSHION MATERIAL
12 SEATBACK
12a SKIN MATERIAL
12b CUSHION MATERIAL
13 HEADREST
13a SKIN MATERIAL
13b CUSHION MATERIAL
20 LEG MEMBER
22 LOCKING DEVICE
23 LOCKING CLAW
30 COVER MEMBER
31 OPENING PART
32 CONTACT SURFACE
33 BEAD PORTION
40 LIP PART
41 FIRST SLIT
42 SECOND SLIT
43, 44 NOTCH
45 FRONT SURFACE
46 BACK SURFACE
47 PROTRUDING PART
50 SEAT PLATE
51 GRIP PORTION
52 HOUSING PART
55 SUPPORT MEMBER

The invention claimed is:

1. A vehicle seat comprising:
a seating part on which an occupant sits;
a leg member that supports the seating part and that includes a locking device at a lower end of the leg member;
a cover member that covers a front side of the leg member, wherein an opening part is formed at a position of the cover member that overlaps with the locking device; and
an elastically deformable lip part that is attached to the cover member and that covers the opening part,
wherein the lip part comprises a first slit that extends upward from a lower end of the lip part and a second slit that extends in a width direction of the cover member and that intersects with the first slit in a T-shape, and wherein a notch is formed at an intersection of the first slit and the second slit.

2. The vehicle seat according to claim 1, wherein the opening part of the cover member is disposed at a position out of a center in a width direction of the cover member.

3. The vehicle seat according to claim 1, wherein the cover member comprises a bead portion around the opening part.

4. The vehicle seat according to claim 1, wherein the lip part is located at a rear of a front surface of the cover member.

5. The vehicle seat according to claim 1, wherein a contact surface at which the cover member and the lip part contact with each other is inclined.

6. The vehicle seat according to claim 1, wherein a first slit extending upward from a lower end of the lip part is provided in the lip part, and wherein a notch is formed at a lower end of the first slit.

7. The vehicle seat according to claim 1, wherein a plurality of protruding parts is provided on a face of the lip part opposing to the locking device.

8. The vehicle seat according to claim 1, further comprising:
a support member that supports rotatably one side of the seating part,
wherein the vehicle seat is rotatable backward for storage.

9. A vehicle seat comprising:
a seating part on which an occupant sits;
a leg member that supports the seating part and that includes a locking device at a lower end of the leg member;
a cover member that covers a front side of the leg member, wherein an opening part is formed at a position of the cover member that overlaps with the locking device; and
an elastically deformable lip part that is attached to the cover member and that covers the opening part,
wherein a grip portion is provided on a lower surface of the seating part, wherein the grip portion is located at front of and above the cover member when the vehicle seat is in a seatable state.

10. The vehicle seat according to claim 9, wherein the opening part of the cover member is disposed at a position out of a center in a width direction of the cover member.

11. The vehicle seat according to claim 9, wherein the cover member comprises a bead portion around the opening part.

12. The vehicle seat according to claim 9, wherein the lip part is located at a rear of a front surface of the cover member.

13. The vehicle seat according to claim 9, wherein a contact surface at which the cover member and the lip part contact with each other is inclined.

14. The vehicle seat according to claim 9, wherein the lip part comprises a first slit that extends upward from a lower end of the lip part and a second slit that extends in a width direction of the cover member and that intersects with the first slit in a T-shape, and wherein a notch is formed at an intersection of the first slit and the second slit.

15. A vehicle seat comprising:
a seating part on which an occupant sits;
a leg member that supports the seating part and that includes a locking device at a lower end of the leg member;
a cover member that covers a front side of the leg member, wherein an opening part is formed at a position of the cover member that overlaps with the locking device; and
an elastically deformable lip part that is attached to the cover member and that covers the opening part,
wherein the seating part comprises a housing part configured to house the leg member and the cover member and provided on a lower surface of the seating part.

16. The vehicle seat according to claim 15, wherein the opening part of the cover member is disposed at a position out of a center in a width direction of the cover member.

17. The vehicle seat according to claim 15, wherein the cover member comprises a bead portion around the opening part.

18. The vehicle seat according to claim 15, wherein the lip part is located at a rear of a front surface of the cover member.

19. The vehicle seat according to claim 15, wherein a contact surface at which the cover member and the lip part contact with each other is inclined.

20. The vehicle seat according to claim 15, wherein the lip part comprises a first slit that extends upward from a lower end of the lip part and a second slit that extends in a width direction of the cover member and that intersects with the first slit in a T-shape, and wherein a notch is formed at an intersection of the first slit and the second slit.

* * * * *